(12) United States Patent
Malhotra (10) Patent No.: US 10,732,766 B2
(45) Date of Patent: Aug. 4, 2020

(54) SYSTEM AND METHOD FOR A TRANSCEIVER SYSTEM FOR TOUCH DETECTION

(71) Applicant: Samsung Display Co., Ltd., Yongin, Gyeonggi-do (KR)

(72) Inventor: Gaurav Malhotra, Cupertino, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 347 days.

(21) Appl. No.: 15/356,502

(22) Filed: Nov. 18, 2016

(65) Prior Publication Data

US 2018/0059867 A1 Mar. 1, 2018

Related U.S. Application Data (60) Provisional application No. 62/379,648, filed on Aug. 25, 2016.

(51) Int. Cl.
*G06F 3/041* (2006.01)
*G06F 3/044* (2006.01)

(52) U.S. Cl.
CPC .......... *G06F 3/0418* (2013.01); *G06F 3/044* (2013.01); *G06F 2203/04111* (2013.01)

(58) Field of Classification Search
CPC .................. G06F 3/0418; G06F 3/044; G06F 2203/04111
USPC ......................................................... 345/173
See application file for complete search history.

(56) References Cited

U.S. PATENT DOCUMENTS

| 5,565,658 A | * | 10/1996 | Gerpheide | .............. G06F 3/041 178/18.02 |
| 6,043,810 A | * | 3/2000 | Kim | ....................... G06F 3/045 345/173 |
| 7,145,855 B2 | | 12/2006 | Ho | |
| 8,493,360 B2 | | 7/2013 | Kremin et al. | |
| 8,659,579 B2 | | 2/2014 | Nadjar et al. | |
| 9,024,912 B2 | | 5/2015 | Atkinson et al. | |
| 9,059,721 B2 | | 6/2015 | Muhammad | |
| 9,094,026 B2 | | 7/2015 | Canard et al. | |
| 9,146,630 B2 | | 9/2015 | Choi et al. | |

(Continued)

FOREIGN PATENT DOCUMENTS

WO   WO 2016/127117 A1   8/2016

OTHER PUBLICATIONS

EPO Extended Search Report dated Jan. 15, 2018, for corresponding European Patent Application No. 17188013.1 (9 pages).

(Continued)

*Primary Examiner* — Amare Mengistu
*Assistant Examiner* — Gloryvid Figueroa-Gibson
(74) *Attorney, Agent, or Firm* — Lewis Roca Rothgerber Christie LLP (57) ABSTRACT

A transceiver system includes: a touch screen panel; a transmitter to transmit an input signal to an input line of the touch screen panel; a receiver to receive an output signal from an output line of the touch screen panel to detect a touch event on the touchscreen panel; and a state machine to set transmission frequencies of the input signal within a wideband operating frequency of the touch screen panel, and to calibrate the receiver to filter the output signal at the transmission frequencies of the input signal.

20 Claims, 9 Drawing Sheets

(56) References Cited

U.S. PATENT DOCUMENTS

| | | | |
|---|---|---|---|
| 9,280,250 B2 | 3/2016 | Yeh et al. | |
| 9,331,632 B2 | 5/2016 | Lee | |
| 2009/0257471 A1* | 10/2009 | Tanaka | G01S 19/13 375/130 |
| 2010/0059295 A1 | 3/2010 | Hotelling et al. | |
| 2011/0084857 A1* | 4/2011 | Marino | G06F 3/044 341/5 |
| 2011/0148810 A1* | 6/2011 | Kitada | G06F 3/0416 345/174 |
| 2012/0313895 A1 | 12/2012 | Haroun et al. | |
| 2013/0050132 A1 | 2/2013 | Calpe Maravilla et al. | |
| 2013/0176272 A1 | 7/2013 | Cattivelli et al. | |
| 2014/0184536 A1* | 7/2014 | Huang | G06F 3/041 345/173 |
| 2015/0261344 A1 | 9/2015 | Wigdor | |
| 2016/0103500 A1 | 4/2016 | Hussey et al. | |

OTHER PUBLICATIONS

Park, Changbyung et al., "A Pen-Pressure-Sensitive Capacitive Touch System Using Electrically Coupled Resonance Pen," IEEE Journal of Solid-State Circuits, vol. 51, No. 1, Jan. 2016, 9 pages.

Shin, Hyungcheol et al., "A 55dB SNR with 240Hz Frame Scan Rate Mutual Capacitor 30×24 Touch-Screen Panel Read-Out IC Using Code-Division Multiple Sensing Technique," 2013 IEEE International Solid-State Circuits Conference, 2013, 3 pages.

Yang, Jun-Hyeok et al., "A Highly Noise-Immune Touch Controller Using Filtered-Delta-Integration and a Charge-Interpolation Technique for 10.1-inch Capacitive Touch-Screen Panels," 2013 IEEE International Solid-State Circuits Conference, 2013, 3 pages.

\* cited by examiner

SYSTEM AND METHOD FOR A TRANSCEIVER SYSTEM FOR TOUCH DETECTION

CROSS-REFERENCE TO RELATED APPLICATION

This utility patent application claims priority to and the benefit of U.S. Provisional Patent Application Ser. No. 62/379,648, filed Aug. 25, 2016, entitled "A SYSTEM AND METHOD FOR A TRANSCEIVER ARCHITECTURE FOR TOUCH SENSORS," the entire content of which is incorporated herein by reference.

BACKGROUND

1. Field

One or more aspects of example embodiments of the present invention relate to a touchscreen panel, and a method of driving the same.

2. Description of the Related Art

A touch screen panel is an input device capable of inputting a user's instruction by selecting an instruction content that is displayed on a display device, or the like, with a human hand or an object, for example. To this end, the touch screen panel may be provided on a front surface of the display device to convert information of a touch point (e.g., a contact position) of the human hand or the object into an electrical signal. The instruction content selected at the touch point may then be recognized as an input signal. Because the touch screen panel may be substituted for a separate input device connected to the display device, such as a keyboard or a mouse, its areas of application have been gradually extended.

Implementation types of touch sensors of the touch screen panel include resistive overlay touch sensors, photosensitive touch sensors, capacitive touch sensors, and the like. Among these touch sensors, the capacitive touch sensor converts the touch point information into an electrical signal by sensing a change in capacitance formed between a conductive sensing electrode and an adjacent (or overlapping) sensing electrode or ground electrode when a user's hand or object comes in contact with the touch screen panel.

The above information disclosed in this Background section is for enhancement of understanding of the background of the invention, and therefore, it may contain information that does not constitute prior art.

SUMMARY

One or more aspects of example embodiments of the present invention provide a transceiver system for detecting touch events on a touch screen panel, and a method of driving the same.

According to an example embodiment of the present invention, a transceiver system includes: a touch screen panel; a transmitter configured to transmit an input signal to an input line of the touch screen panel; a receiver configured to receive an output signal from an output line of the touch screen panel to detect a touch event on the touchscreen panel; and a state machine configured to set transmission frequencies of the input signal within a wideband operating frequency of the touch screen panel, and to calibrate the receiver to filter the output signal at the transmission frequencies of the input signal.

In an example embodiment, the transmitter may include: a digital to analog converter; and a voltage controlled oscillator.

In an example embodiment, the state machine may include: a frequency control configured to set the transmission frequencies of the input signal.

In an example embodiment, the receiver may include a digital bandpass filter, and the state machine may further include a digital bandpass filter coefficient selector to calibrate the digital bandpass filter according to the transmission frequencies.

In an example embodiment, the receiver may include: a plurality of notch filters configured to remove noise at frequencies identified through Fast Fourier Transform of the output signal.

In an example embodiment, the input line may include a plurality of input lines, and the input signal may be transmitted to the input lines sequentially.

In an example embodiment, the input signal may include a plurality of input signals that are divided into sub-bands of the wideband operating frequency, the input line may include a plurality of input lines, and the input signals may be transmitted to the input lines concurrently.

In an example embodiment, the receiver may include a plurality of digital bandpass filters, and the state machine may include a digital bandpass filter coefficient selector to calibrate each of the digital bandpass filters according to a corresponding one of the sub-bands.

According to an example embodiment of the present invention, a display device includes: a display panel configured to display an image at an active area; a touch screen panel overlapping with the display panel at the active area; a transmitter configured to transmit an input signal to an input line of the touch screen panel; a receiver configured to receive an output signal from an output line of the touch screen panel to detect a touch event on the touchscreen panel; and a state machine configured to set transmission frequencies of the input signal within a wideband operating frequency of the touch screen panel, and to calibrate the receiver to filter the output signal at the transmission frequencies of the input signal.

In an example embodiment, the transmitter may include: a digital to analog converter; and a voltage controlled oscillator.

In an example embodiment, the state machine may include: a frequency control configured to set the transmission frequencies of the input signal.

In an example embodiment, the receiver may include a digital bandpass filter, and the state machine may further include a digital bandpass filter coefficient selector to calibrate the digital bandpass filter according to the transmission frequencies.

In an example embodiment, the receiver may include: a plurality of notch filters configured to remove noise at frequencies identified through Fast Fourier Transform of the output signal.

In an example embodiment, the input line may include a plurality of input lines, and the input signal may be transmitted to the input lines sequentially.

In an example embodiment, the input signal may include a plurality of input signals that are divided into sub-bands of the wideband operating frequency, the input line may include a plurality of input lines, and the input signals may be transmitted to the input lines concurrently.

In an example embodiment, the receiver may include a plurality of digital bandpass filters, and the state machine may include a digital bandpass filter coefficient selector to calibrate each of the digital bandpass filters according to a corresponding one of the sub-bands.

According to an example embodiment of the present invention, a method of driving a touch screen panel includes: setting, by a state machine, transmission frequencies of an input signal within a wideband operating frequency of the touch screen panel; generating, by a transmitter, the input signal; transmitting, by the transmitter, the input signal to the touch screen panel; and filtering, by a receiver, an output signal of the touch screen panel at the transmission frequencies of the input signal.

In an example embodiment, the method may further include: applying, by the state machine, Fast Fourier Transform on the output signal to identify frequencies having noise; and filtering, by the receiver, the output signal at the identified frequencies.

In an example embodiment, the input signal may be sequentially transmitted to input lines of the touch screen panel.

In an example embodiment, the method may further include: dividing, by the state machine, the input signal into sub-bands of the wideband operating frequency; and transmitting, by the transmitter, the sub-bands of the input signal to input lines of the touch screen panel concurrently.

BRIEF DESCRIPTION OF THE DRAWINGS

The above and other aspects and features of the present invention will become apparent to those skilled in the art from the following detailed description of the example embodiments with reference to the accompanying drawings.

DETAILED DESCRIPTION

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Generally, for capacitive touch screen panels, a known (e.g., set or predetermined) signal is input to a touch sensor of the touch screen panel (TSP), and the output of the touch sensor is monitored. Typically, the input signal may be in the form of a clock pattern (e.g., a clock signal) with alternating sequence of ones and zeros, or may be in the form of a sinusoid waveform. While less common, ramp waveforms or saw-tooth waveforms may be used as the input signals. The output signal changes (typically it drops in magnitude) in response to a touch event (e.g. a finger or object such as a stylus contacting the TSP).

For a given touch sensor, there is a narrow band of frequencies where the touch sensor exhibits a difference between a touch and no-touch. This band of frequencies is ideal for transmitting the input signal, but there may also be noise sources that occupy the same band of frequencies. These noise sources may be time varying and/or frequency varying, and may lead to false indications of touch events on the TSP.

According to one or more example embodiments of the present invention, the input signal may be spread out over a wideband (or sub-bands within the wideband) of frequencies, and touch events may be detected in the output signal on the same frequencies (or instantaneous frequencies) of the input signal. According to one or more embodiments of the present invention, one or more state machines may control one or more transmitters to transmit the input signal to the TSP at set or predetermined frequencies spread over a wideband (or sub-bands within the wideband), and the one or more state machines may calibrate one or more receivers to listen to the output signal for touch events on the same set or predetermined frequencies over the wideband (or sub-bands) as that of the input signal, while filtering out noises at other frequencies. For example, the receivers may be connected to output lines of the TSP, and each of the receivers may include one or more filters (e.g., bandpass filters) to filter the output signal on each of the output lines to detect touch events. The state machines may configure each of the filters according to the same or instantaneous frequency of the input signals at any given time. Accordingly, touch events may be detected on the output signals at the same or instantaneous frequency of the input signal, while noises are filtered out at other frequencies.

Accordingly, undesirable noises may be reduced or eliminated, leading to a more reliable TSP. Further, because the input signal is spread out over the wideband of frequencies, electromagnetic emissions may also be reduced.

Figure 1:
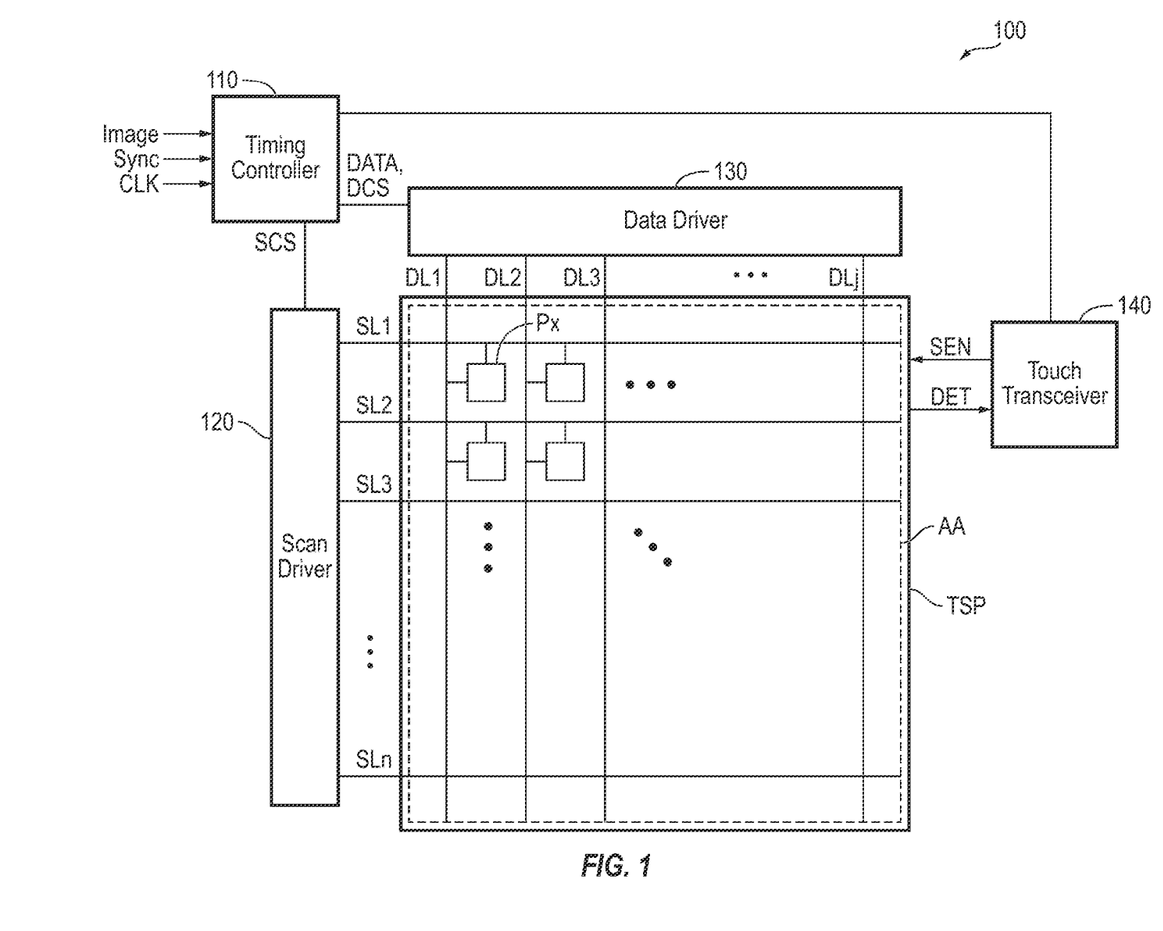
FIG. 1 is a diagram illustrating a display device including a touch screen panel according to one or more embodiments of the present invention.
Figure 2:
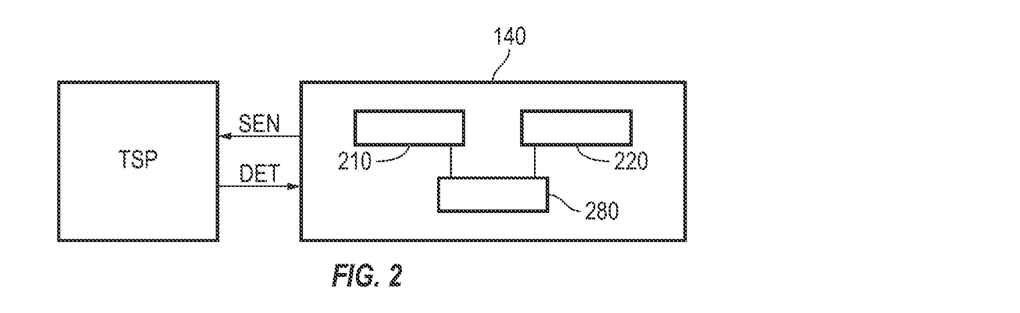
FIG. 2 is a diagram illustrating a transceiver system according to one or more embodiments of the present invention.
Figure 3:
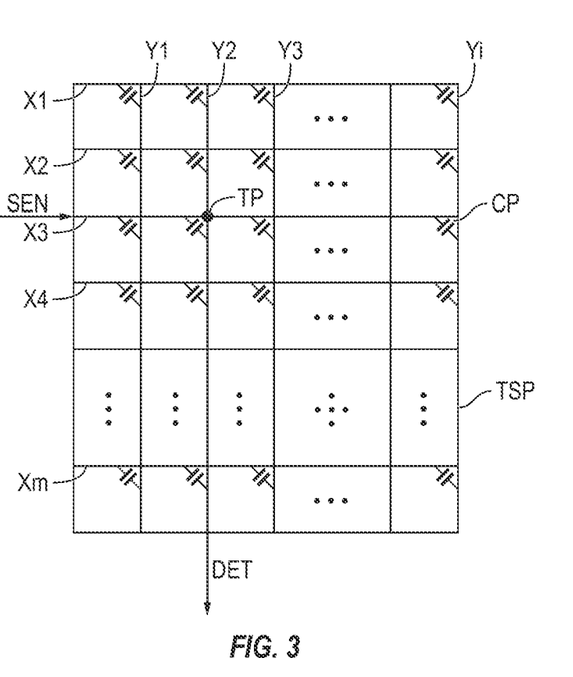
FIG. 3 is a diagram illustrating an example of the touch screen panel shown in FIGS. 1 and 2 according to one or more embodiments of the present invention.

FIG. 1 is a diagram illustrating a display device including a touch screen panel according to some embodiments of the present invention, FIG. 2 is a diagram illustrating a transceiver system according to some embodiments of the present invention, and FIG. 3 is a diagram illustrating an example of the touch screen panel shown in FIGS. 1 and 2 according to some embodiments of the present invention.

Referring to FIGS. 1 through 3, a display device 100 includes a timing controller 110, a scan driver 120, a data driver 130, and a plurality of pixels Px arranged in an active area (e.g., a display area or a touch area) AA. Each of the plurality of pixels Px is coupled to respective ones of scan lines SL1 to SLn, where n is a positive integer, and data lines DL1 to DLj, where j is a positive integer, at crossing regions of the scan lines SL1 to SLn and the data lines DL1 to DLj. Each of the pixels Px receives a data signal from the data driver 130 through the respective one of the data lines DL1 to DLj, when a scan signal is received from the scan driver 120 through a respective one of the scan lines SL1 to SLn.

The timing controller 110 receives an image signal Image, a synchronization signal Sync, and a clock signal CLK from an external source (e.g., external to the timing controller). The timing controller 110 generates image data DATA, a data driver control signal DCS, and a scan driver control signal SCS. The synchronization signal Sync may include a vertical synchronization signal Vsync and a horizontal synchronization signal Hsync. The timing controller 110 transmits the image data DATA and the data driver control signal DCS to the data driver 130, and transmits the scan driver control signal SCS to the scan driver 120.

A touch screen panel TSP may be arranged to overlap with the plurality of pixels Px in the active area AA. The touch screen panel TSP may detect a touch point (e.g., a contact position or a touch event) TP of a user's hand or object at the active area AA, and may convert information of the touch point TP into an electrical signal. The electrical signal may be transmitted to a corresponding receiver connected to a corresponding output line of the touch screen panel TSP as an output signal of the touch screen panel TSP.

In this regard, a touch transceiver (or touch driver) 140 may be connected to the touch screen panel TSP. The touch transceiver 140 may include one or more transmitters 210, one or more receivers 220, and one or more state machines 280 to control and configure the transmitters 210 and the receivers 220. According to one or more example embodiments of the present invention, the state machines 280 may control the transmitter 210 to transmit an input signal over wideband frequencies (or sub-bands within the wideband) to the touch screen panel TSP, and may calibrate the receiver 220 to listen to the output signal at the same frequencies of the input signal, while filtering out noise at other frequencies. Accordingly, the state machines 280 may keep the one or more transmitters 210 in sync with the one or more receivers 220, so that touch events may be detected at any given time at a corresponding frequency over the wide band frequencies (or sub-bands).

The touch screen panel TSP may include a plurality of touch sensors. In some embodiments, the plurality of touch sensors may include, for example, a plurality of first lines (e.g., first electrodes or input lines) X1 to Xm, and a plurality of second lines (e.g., second electrodes or output lines) Y1 to Yi crossing the plurality of first lines X1 to Xm, where m and i are natural numbers. For example, the plurality of first lines X1 to Xm may extend in a row direction, and the plurality of second lines Y1 to Yi may extend in a column direction.

A mutual parasitic capacitor Cp may be formed at each crossing region of the first lines X1 to Xm and the second lines Y1 to Yi. Each crossing region at which the mutual parasitic capacitor Cp is formed may operate as a touch sensor (or sensing cell) that may recognize a touch event.

The touch transceiver 140 may supply input signals SEN to the first lines X1 to Xm through control of the timing controller 110. For example, the one or more transmitters 210 may be connected to the first lines X1 to Xm to supply the input signals SEN to the first lines X1 to Xm sequentially or concurrently (e.g., simultaneously or at the same time). In an embodiment in which the input signals SEN are supplied to the first lines X1 to Xm, the mutual capacitance generated in each touch sensor generates an output signal (e.g., a sensing signal) DET on corresponding second lines Y1 to Yi. Thus, in the event that a user's finger or object comes in contact with the touch screen panel TSP, for example, at the touchpoint TP in FIG. 2, a change in mutual capacitance occurs at the touchpoint TP. Accordingly, the output signal DET on a corresponding one of the second lines Y1 to Yi (e.g., at the second output line Y2 in the example shown in FIG. 2) is also changed, thereby registering (or recognizing) a touch. In this regard, the one or more receivers 220 may be connected to the second lines Y1 to Yi to receive and filter the output signals DET from the second lines Y1 to Yi.

While ideally, the change in mutual capacitance only occurs when a user's finger or object comes in contact with the touch screen panel TSP, the change in mutual capacitance may occur due to an undesirable noise source, which may lead to a potential false positive for a touch event. However, in many cases, the noise from the undesirable noise source may only appear on a single or narrow band of frequencies, while legitimate touch events may still be detected across wideband frequencies. Accordingly, in one or more embodiments of the present invention, the input signal SEN may be spread over a wideband of frequencies (or sub-bands within the wideband of frequencies), and touch events may be detected on the same frequencies of that of the input signal SEN, while noise is filtered out at other frequencies.

Figure 4A:
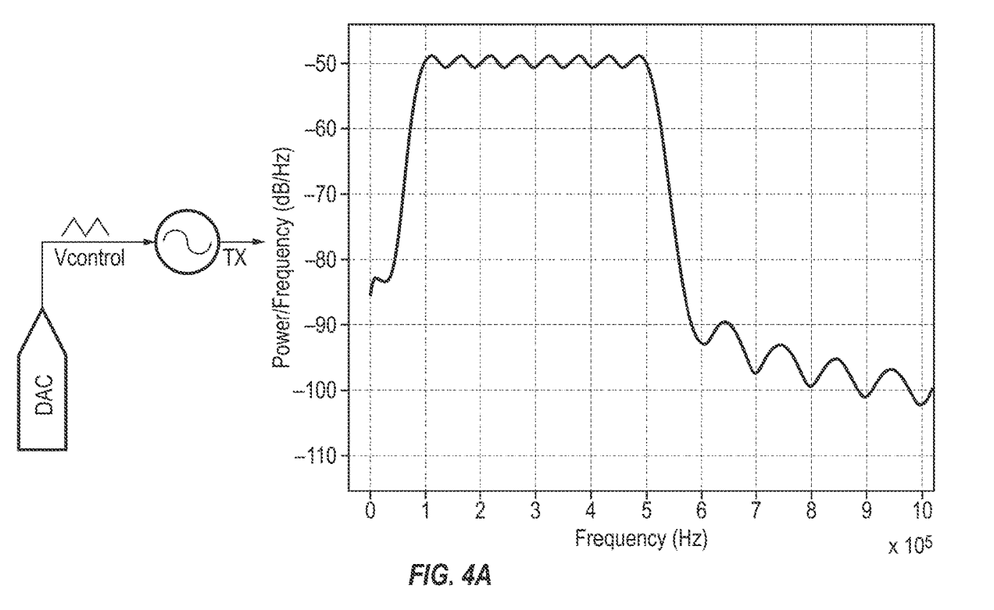
FIGS. 4A-4D are examples of input signals according to one or more embodiments of the present invention.
Figure 4B:
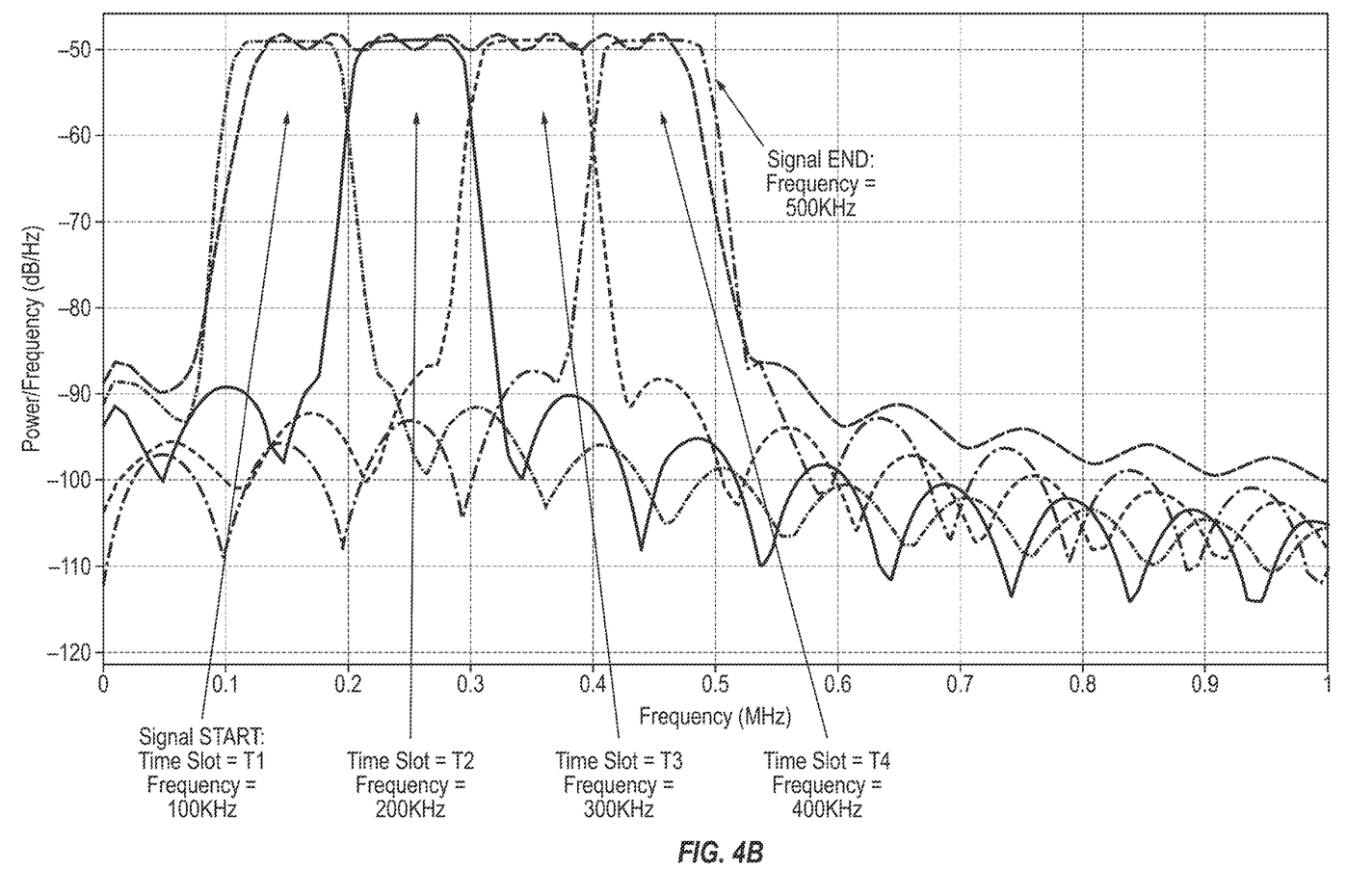
Figure 4C:
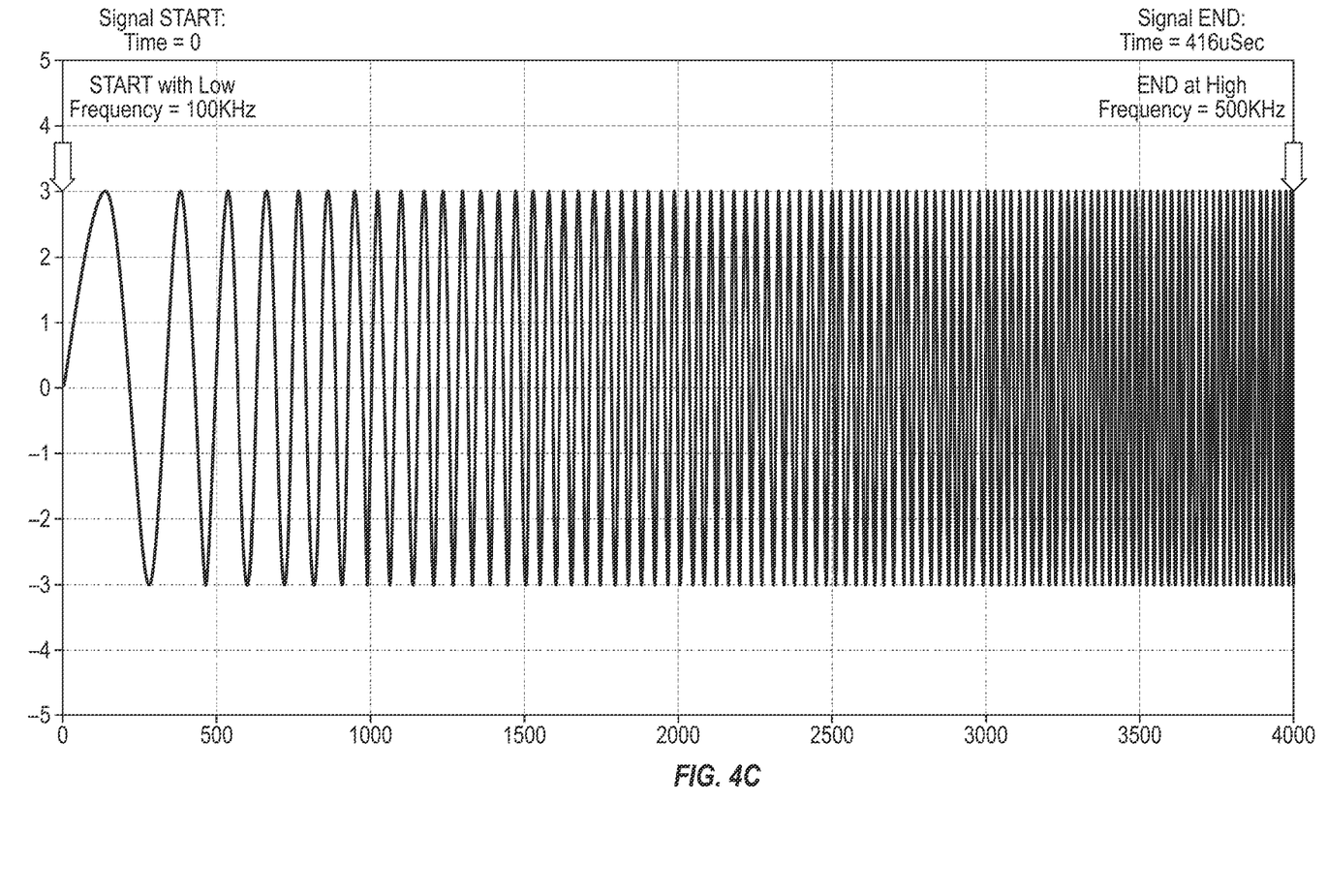
Figure 4D:
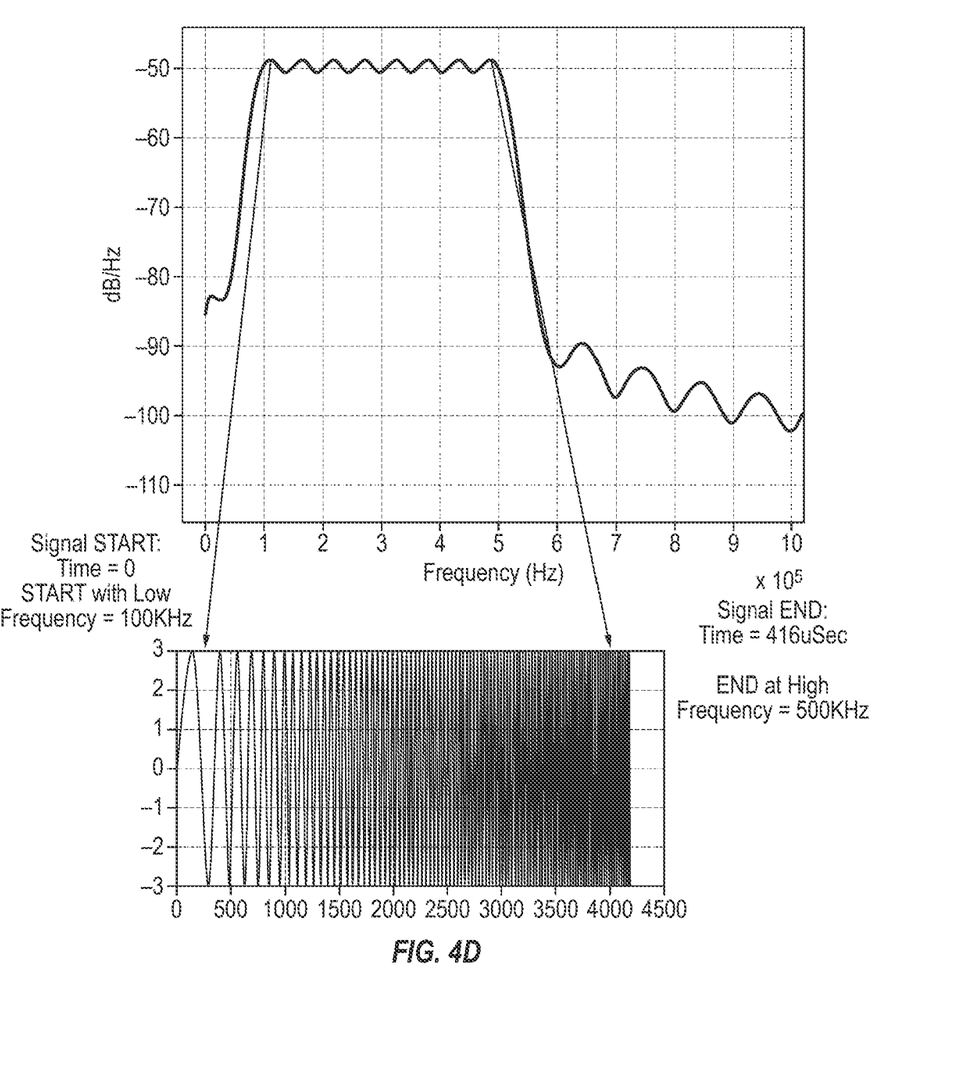

FIGS. 4A through 4D are examples of input signals according to one or more embodiments of the present invention. FIG. 4A illustrates a wideband of useful frequencies for a corresponding touch screen panel in the frequency domain, according to an example embodiment of the present invention. FIG. 4B illustrates the input signal of FIG. 4A changing over time, according to an example embodiment of the present invention. FIG. 4C illustrates the input signal of FIG. 4A in the time domain, according to an example embodiment of the present invention. FIG. 4D illustrates a comparison of the input signal in the frequency domain of FIG. 4A with the time domain of FIG. 4C.

Referring to FIGS. 4A through 4D, for any particular touch screen panel TSP, there is a frequency band in which the touch screen panel TSP operates. This frequency band may be referred to as a useful frequency band, optimal frequency band, operational frequency band, or "sweet spot." The parameters of any given touch screen panel TSP may be dictated by the manufacturer of the touch screen panel TSP. For example, the parameters of the particular touch screen panel TSP shown in FIG. 4A may have a useful frequency band over a wideband of frequencies of about 100 kHz to about 500 kHz. Accordingly, in this case, the input signal, according to an embodiment of the present invention, may be spread over the useful frequency band of about 100 kHz to about 500 kHz (or sub-bands within the useful frequency band).

For example, referring to FIGS. 4B-4D, in order to spread the input signal over the useful frequency band, the frequency of the input signal may gradually change over time within the wideband of the useful frequency band. For example, to spread the input signal over the wideband of frequencies from about 100 kHz to about 500 kHz, the input signal may be input starting from about 100 kHz and may gradually increase to about 500 kHz over a time depending on the refresh rate and the number of input lines. Further, the receiver may be calibrated to listen for touch events on the same or instantaneous frequency of the input signal at any given time, while filtering out noise at other frequencies.

For example, referring to FIGS. 2 and 4B, at time T1, the state machines 280 may control the transmitter 210 to transmit the input signal at a frequency of about 100 kHz, and at the same time, may calibrate the receivers 220 to listen to the output signal at the same frequency of about 100 kHz, while filtering out noise at the other frequencies, for example, below 90 kHz and above 110 kHz. Between times T1 and T2, the state machines 280 may gradually increase the frequency of the input signal between 100 kHz and 200 kHz, all the while recalibrating the receivers for the gradual increases. For example, between time T1 and T2, the state machines 280 may increase the frequency of the input signal in increments of about 10 kHz (e.g., 110 kHz, 120 kHz, 130 kHz, etc.), while recalibrating the receivers to listen to the output signal at the same increments of about 10 kHz (e.g., 110 kHz, 120 kHz, 130 kHz, etc.), while filtering out noise at other frequencies. Thus, when the input signal is increased to about 110 kHz, the receivers may be calibrated to detect touch events at about 110 kHz, while filtering out noise below about 100 kHz and above about 120 kHz. When the input signal is increased to about 120 kHz, the receivers may be calibrated to detect touch events at about 120 kHz, while filtering out noise below about 110 kHz and above about 130 kHz, and so on and so forth.

Similarly, between times T2 to T3, T3 to T4, and T4 to the signal end, the state machines 280 may control the transmitter 210 to transmit the input signal at a frequency of about 200 kHz to the end of the signal at about 500 kHz, and may calibrate the receivers 220 to listen to the output signal at the same frequencies, while filtering out noise at the other frequencies. In this manner, the state machines 280 may control the transmitter 210 to spread the input signal over the wideband of frequencies of the useful frequency band, while calibrating the receivers 220 to listen to the output signal at the same frequencies as that of the input signals and filtering out noise at the other frequencies. While FIG. 4B shows the frequencies being incremented in units of 100 kHz, the present invention is not limited thereto, and the frequencies may be incremented in any suitable units over the useful frequency band over time.

According to some embodiments, the transmitter 210 may transmit the input signals to the input lines (e.g., X1 to Xm in FIG. 3) sequentially (e.g., line by line). For example, the transmitter 210 may transmit the input signal over the wideband of the useful frequency band (or sub-bands within the useful frequency band) to each of the input lines at different times, and each of the receivers may be calibrated to listen for the output signal on a corresponding one of the output lines (e.g., Y1 to Yi) at the same or instantaneous frequencies of the input signal, while filtering out noise at the other frequencies.

For example, the state machines 280 may cycle through n states (n being a natural number) within a set or predetermined period of time. The set or predetermined period of time may be determined according to the refresh rate and the number of input lines. For example, when the refresh rate is 120 Hz and the number of input lines is 20, the set or predetermined period of time may be about 416 µS (e.g., 1/120/20). The input signal may be transmitted to each of the input lines one at a time between refreshes, so over the course of the set or predetermined time, the state machine may cycle through the n states for the corresponding input line. For each state, the state machines 280 may control the transmitter 210 to transmit the input signal at a transmission frequency within the useful frequency band to the corresponding input line, and may configure filter coefficients (e.g., bandpass coefficients) for each of the receivers to listen at the corresponding transmission frequency. Once the state machines 280 reach the nth state, the state machines 280 reset to the initial state for the next input line. In this case, because the input lines receive the input signals at different times, a coordinate of the touch point TP may be determined by a timing of the input signal transmitted to a corresponding one of the input lines and the touch event detected on corresponding one of the output lines.

However, the present invention is not limited thereto, for example, according to some embodiments, the transmitter 210 may transmit the input signals to the input lines concurrently (e.g., simultaneously or at the same time). In this case, the input signals may be concurrently transmitted to the input lines over a different sub-band within the useful frequency band, and each of the receivers may be configured to listen to the output signals over every sub-band.

In this case, the number of sub-bands for concurrently transmitting the input signals to the input lines depends on the number of input lines. For example, assuming a touch screen panel TSP has 4 input lines, the useful frequency band may be divided into four sub-bands, and each of the input lines may receive an input signal over a different one of the sub-bands concurrently with each other. Thus, in this case, referring to FIG. 4B, for example, the state machines 280 may configure a first transmitter from among the transmitters 210 to transmit an input signal over about 100 kHz to about 200 kHz of the useful frequency band to a first input line, a second transmitter from among the transmitters 210 to transmit an input signal over about 200 kHz to about 300 kHz of the useful frequency band to a second input line, a third transmitter from among the transmitters 210 to transmit an input signal over about 300 kHz to about 400 kHz of the useful frequency band to a third input line, and a fourth transmitter from among the transmitters 210 to transmit an input signal over about 400 kHz to about 500 kHz of the useful frequency band to a fourth input line, concurrently.

Further, when the input signals are transmitted to the input lines concurrently, each of the receivers connected to the output lines may be calibrated to concurrently listen to the instantaneous frequencies of each of the transmitters, while filtering out noise at other frequencies. For example, each of the receivers may have a first filter (e.g., a first bandpass filter) to listen to the instantaneous frequencies of the sub-band of the first input line, a second filter (e.g., a second bandpass filter) to listen to the instantaneous frequencies of the sub-band of the second input line, a third filter (e.g. a third bandpass filter) to listen to the instantaneous frequencies of the sub-band of the third input line, and a fourth filter (e.g., a fourth bandpass filter) to listen to the instantaneous frequencies of the fourth input line, while respectively filtering out noise at the other frequencies. In this case, the state machines 280 may calibrate each of the filters of each of the receivers to listen to the instantaneous frequencies of the respective sub-bands, while filtering out noise at the other frequencies. Accordingly, a coordinate of the touch event may be determined based on the output line in which the touch event is detected and the corresponding sub-band over which the touch event is detected.

Figure 5:
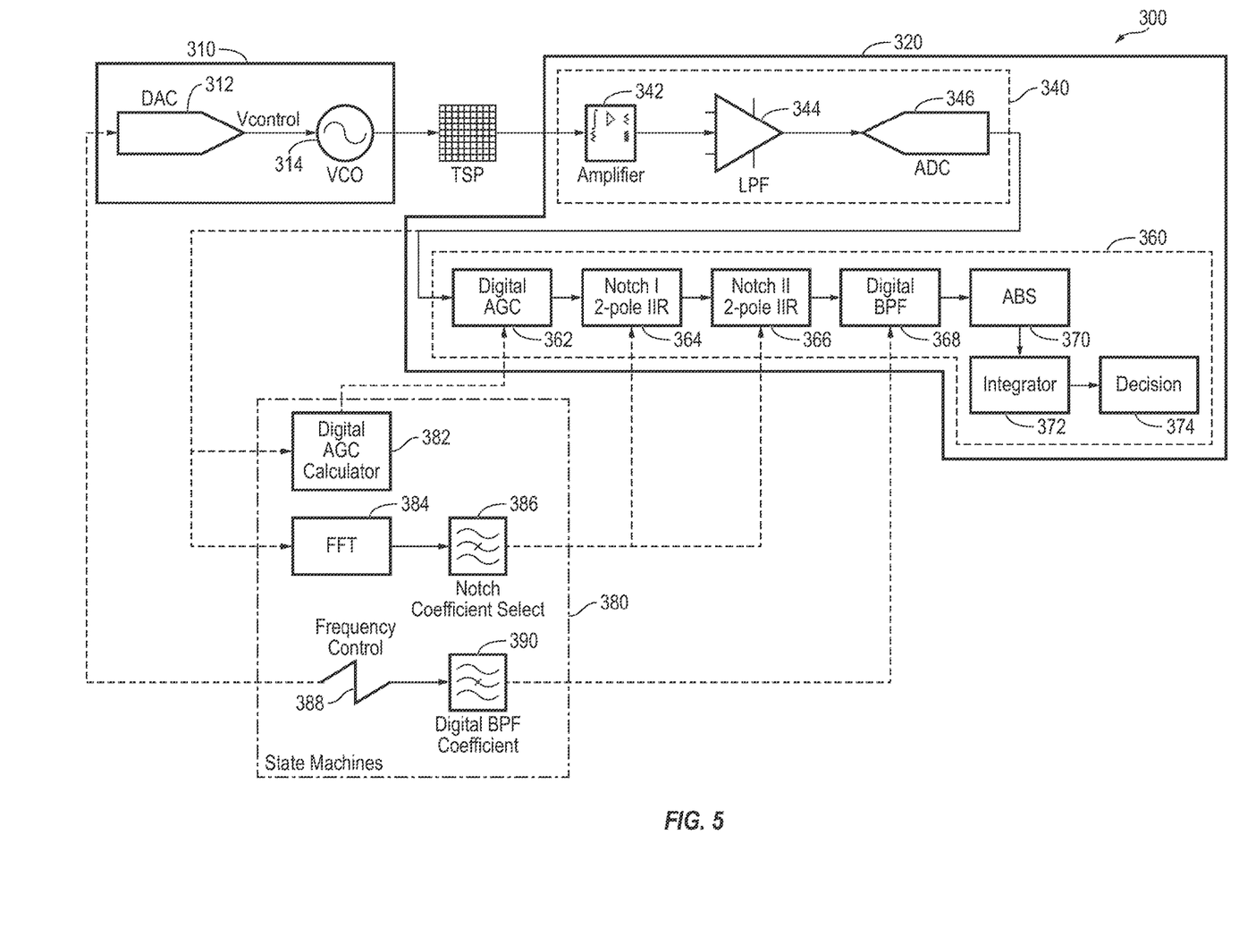
FIG. 5 illustrates a transceiver system for touch detection according to one or more example embodiments of the present invention.

FIG. 5 illustrates a transceiver system for touch detection according to an example embodiment of the present invention.

Referring to FIG. 5, the transceiver system 300 may include a transmitter 310, a touch screen panel TSP, one or more receivers 320, and one or more state machines 380. The touch screen panel TSP may have the same or substantially the same structure as that of the touch screen panel TSP shown in FIG. 3, and thus, detailed description thereof will not be repeated.

The transmitter 310 may be coupled to each of the input lines (e.g., see X1 to Xm in FIG. 2) to transmit input signals to the input lines. In one embodiment, for example, the transmitter 310 may sequentially supply the input signals to the input lines.

In an example embodiment, the transmitter 310 may include a digital to analog converter (DAC) 312 and a voltage controlled oscillator (VCO) 314. The transmitter 310 may generate an input signal (e.g., a band pass input signal) by varying the VCO's control voltage via the DAC according to control of the state machines 380. For example, referring back to FIG. 4A, the state machines 380 may control the transmission frequency of the input signal to be spread over a wideband of frequencies (or sub-bands) over time corresponding to a useful frequency band of the particular touch screen panel TSP (or touch sensor), by varying the VCO's control voltage (Vcontrol) via the DAC of the transmitter 310 over time.

The receiver 320 may include a plurality of receivers, and each of the receivers may be coupled to a corresponding one of the output lines (e.g., see Y1 to Yi in FIG. 3) to detect touch events on the touch screen panel TSP. For example, FIG. 5 shows a first receiver 420 from among the plurality of receivers that is coupled to a first output line (e.g., Y1), for convenience. However, each of the other receivers from among the plurality of receivers may be coupled to a corresponding one of the other output lines (e.g., Y2 to Yi), and may have the same or substantially the same structure as that of the first receiver 320 shown in FIG. 5. Therefore, detailed description thereof will not be repeated.

The state machines 380 may calibrate the receivers 320 to be in sync (e.g., in time domain and frequency domain) with the transmitter 310 to listen for touch events on the same or instantaneous frequency of the input signal transmitted by the transmitter 310. Accordingly, the receivers 320 monitor the output signal at the same transmission frequency of the input signal to detect the touch events, while naturally nulling out noises. In this regard, according to an embodiment, the receiver 320 may include analog components 340 and digital components 360.

According to an embodiment, the analog components 340 may include an amplifier 342, a filter (e.g., a 3rd order low pass filter) 344, and an analog to digital converter (ADC) 346. The amplifier 342 may amplify the output signal received from the TSP at a desired frequency range. The filter 344 may pass the output signal at a cutoff frequency, and may attenuate the output signal at frequencies higher or lower than the cutoff frequency. The ADC 346 may convert the output signal to a digital signal, and may transmit the digital output signal to the digital components 360 and to the state machines 380.

According to an embodiment, the digital components 360 may include a digital automatic gain control (AGC) (e.g., an AGC module or an automatic gain controller) 362, one or more notch filters 364 and 366, a digital bandpass filter (BPF) 368, an absolute value block (ABS) 370, an integrator 372, and a decision block 374. According to an embodiment, the state machines 280 may include a digital AGC value selector (e.g., a digital AGC calculator) 382 to control and calibrate the digital AGC 362, a Fast Fourier Transform (FFT) (e.g., a Fast Fourier Transform module) 384 to determine the frequencies within the output signal at which noise is being introduced, a notch coefficient select 386 to calibrate the notch filters 364 and 366, a frequency control 388 to set the frequencies of the input signal of the transmitter 310, and a digital BPF coefficient (e.g., a digital BPF coefficient selector) 390 to calibrate the digital BPF 368 according to the frequencies of the input signal set by the frequency control 388.

The digital AGC value selector 382 may calibrate the digital AGC 362 to boost the gain of the output signal received from the ADC 346. For example, the digital AGC value selector 382 may calculate a weighted factor (e.g., an AGCvalue), and may supply the weighted factor to the digital AGC 362. The digital AGC 362 may multiply the output signal of the ADC 346 by the weighted factor to produce a constant or substantially constant output signal.

The notch filters 364 and 366 may remove noise from the output signal at set or predetermined frequencies according to the transmission frequency of the input signal. For example, FFT 384 may determine the frequencies within the output signal at which noise is introduced, and the notch coefficient select 386 may calibrate the notch filters 364 and 366 to remove (or filter) the noise at the identified frequencies. For example, if the FFT 384 identifies that there is excessive noise at 50 GHz and 100 GHz, one notch filter may be set to remove the noise at 50 GHz and another notch filter may be set to remove the noise at 100 GHz. In an example embodiment, each of the notch filters 364 and 366 may be a 2-pole infinite impulse response (IIR) filter, but the present invention is not limited thereto. While FIG. 3 shows that there are two notch filters, the present invention is not limited thereto. For example, in other embodiments, there may be any suitable number of notch filters, or the notch filters may be omitted all together.

According to one or more embodiments of the present invention, the FFT 384 may be a 256 point FFT of the ADC 346 output. That is, the FFT 384 may take 256 contiguous ADC output values to perform the FFT. Multiple readings of the FFT may then be averaged to form reliable spectral information (e.g., FFT_Average). A difference between the average FFT and the FFT of the original signal (e.g., FFT_Signal) may be determined, and the difference may be compared to a threshold (e.g., FFT_Threshold). When the difference exceeds the threshold, it may be determined that a tone (e.g., noise) is present at that bin value. This information may be used to select the coefficients of the notch filters. However, the present invention is not limited thereto, and the FFT may be more or less than 256 points. For example, the FFT may be a 128-point FFT or 1024 point FFT.

The digital BPF 368 may further filter the output signal according to the transmission frequency of the input signal. For example, the frequency control 388 may set the transmission frequency of the input signal of the transmitter 310 (e.g., via the DAC 312 and the VCO 314), and may control the digital BPF coefficient 390 to calibrate the digital BPF 368 to listen at the set frequency at any given time. Thus, the receiver 320 may be synced (e.g., in time and in frequency) with the transmitter 310 by adjusting the digital BPF 368 to listen at the same or instantaneous frequency of the input signal.

The ABS block 370 determines the absolute value of the output signal, and the integrator 360 accumulates the absolute values for a set or predetermined time (e.g., one millisecond or a few hundred microseconds). The accumulated value is then compared with a threshold value by the decision block 374 to determine whether or not a touch event occurred on the touch screen panel TSP, and the location (e.g., row and column) at which the touch event occurred.

Accordingly, in some embodiments, the transmitter 310 may input the input signals over the useful frequency band (or sub-bands) over time to the input lines (e.g., X1 to Xm in FIG. 3) sequentially, and the receivers 320 may detect touch events on the output lines (e.g., Y1 to Yi in FIG. 3) at the same transmission frequency of the input signals.

Figure 6:
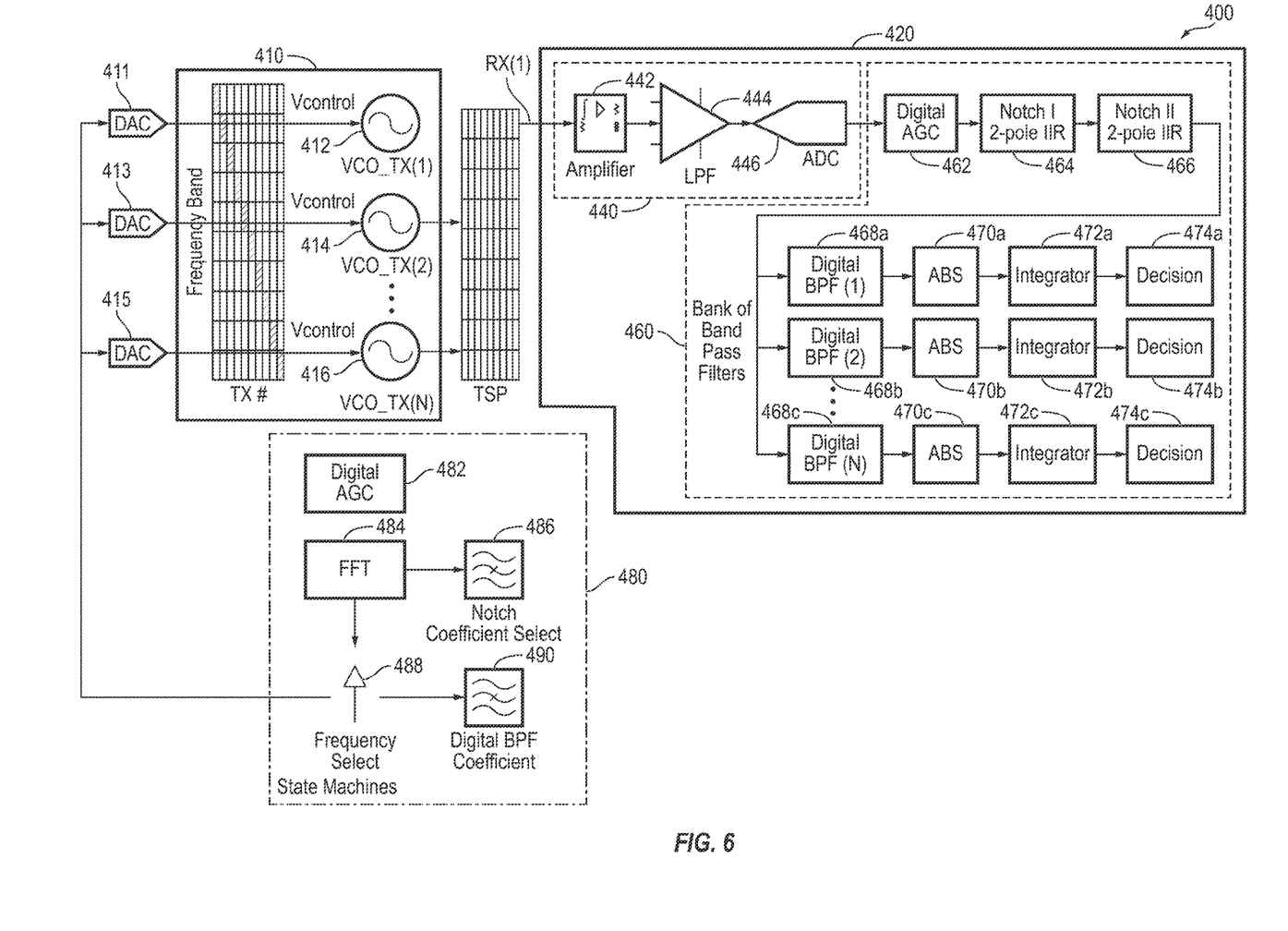
FIG. 6 illustrates a transceiver system for touch detection according to one or more example embodiments of the present invention.

FIG. 6 illustrates a transceiver system for touch detection according to an example embodiment of the present invention.

In the example embodiment of FIG. 6, a plurality of transmitters 410 may transmit input signals to the input lines (e.g., see X1 to Xm in FIG. 3) concurrently (e.g., at the same time), and each of the output lines (e.g., see Y1 to Yi in FIG. 3) may be coupled to a corresponding receiver from among a plurality of receivers 420 to detect touch events on the touch screen panel TSP. For example, to drive N input lines (N being a natural number greater than 1) concurrently, the plurality of transmitters 410 may include N transmitters, and each of the transmitters may include a DAC and a VCO. The state machines 480 may control each of the transmitters to spread the transmission frequencies of the input signal over a different sub-band of the useful frequency band. The transmitters may concurrently transmit the input signals with the corresponding transmission frequencies to the input lines, respectively. Thus, the useful frequency band of a corresponding touch sensor (e.g., see FIGS. 4A-4D) may be divided into N sub-bands. Each transmitter may transmit an input signal having transmission frequencies that are spread across its allocated sub-band to a corresponding one of the input lines (e.g., X1 to Xm). Each of the receivers receives a composite output signal, which is a summation of all the output signals. For example, each of the receivers may include N bandpass filters to listen on the transmission frequencies of each of the input signals to determine which of the rows (e.g., input lines X1 to Xm) have received a touch event. In other words, this may be functionally equivalent to frequency division multiplexing.

According to an embodiment, the transmitter 410 may include a plurality of DACs 411, 413, and 415 respectively coupled to the plurality of VCOs 412, 414, and 416. Each DAC and VCO pair may constitute one transmitter from among the plurality of transmitters, and each of the transmitters may be coupled to a corresponding one of the input lines (e.g., X1 to Xm in FIG. 3). That is, a first transmitter including a first DAC 411 and a first VCO 412 may be coupled to a first input line (e.g., X1), a second transmitter including a second DAC 413 and a second VCO 414 may be coupled to a second input line (e.g., X2), and an Nth transmitter coupled to an Nth DAC 415 and an Nth VCO 416 may be coupled to an Nth input line (e.g., Xm). The plurality of transmitters may transmit input signals to the input lines (e.g., X1 to Xm) concurrently. Each of the input signals may have transmission frequencies that are spread across a corresponding sub-band of the useful frequency band of the corresponding touch sensor (e.g., see FIGS. 4A-4D). In some embodiments, the sub-bands may not overlap with each other, or may partially overlap with each other.

Each of the output lines (e.g., Y1 to Yi in FIG. 3) may be coupled to a corresponding receiver from among a plurality of receivers to detect touch events in the output signal. For example, FIG. 6 shows a first receiver (RX(1)) 420 from among the plurality of receivers that is coupled to a first output line (e.g., Y1), for convenience. However, each of the other receivers from among the plurality of receivers may be coupled to a corresponding one of the other output lines (e.g., Y2 to Yi), and may have the same or substantially the same structure as that of the first receiver 420 shown in FIG. 6. Therefore, detailed description thereof will not be repeated.

According to an embodiment, each of the receivers 420 may include analog components 440 and digital components 460. One or more state machines 480 may automatically calibrate and adjust the receivers 420. The analog components 440 may include an amplifier 442, a filter (e.g., a 3rd order low pass filter) 444, and an analog to digital converter (ADC) 446. The amplifier 442 may amplify the output signal received from the TSP at a desired frequency range. The filter 444 may pass the output signal at a cutoff frequency, and may attenuate the output signal at frequencies higher or lower than the cutoff frequency. The ADC 446 may convert the output signal to a digital signal, and may transmit the digital output signal to the digital components 460 and to the state machines 480.

According to an embodiment, the digital components 460 may include a digital automatic gain control (AGC) (e.g., an AGC module or an automatic gain controller) 462, one or more notch filters 464 and 466, a plurality of digital bandpass filters (BPFs) 468a, 468b, and 468c, a plurality of absolute value blocks (ABSs) 470a, 470b, and 470c, a plurality of integrators 472a, 472b, and 472c, and a plurality of decision blocks 474a, 474b, and 474c. According to an embodiment, the state machines 480 may include a digital AGC value selector (e.g., a digital AGC calculator) 482 to control and calibrate the digital AGC 462, a Fast Fourier transform (FFT) (e.g., a Fast Fourier Transform module) 484 to determine the frequencies within the N sub-band output signals at which noise is being introduced, a notch coefficient select 486 to calibrate the notch filters 464 and 466, a frequency control 488 to set the N sub-band frequencies of each of the input signals of each of the transmitters, and to calibrate each of the receivers 420 to monitor the output signals at the same N sub-band frequencies as those of the input signals, and a digital BPF coefficient (e.g., a digital BPF coefficient selector) 490 to calibrate each of the plurality of digital BPFs 468a, 468b, and 468c according to the frequencies of the input signals.

The digital AGC value selector 482 may calibrate the digital AGC 462 to boost the gain of the output signal received from the ADC 446. For example, the digital AGC value selector 482 may calculate a weighted factor (e.g., an AGCvalue), and may supply the weighted factor to the digital AGC 462. The digital AGC 462 may multiply the output signal of the ADC 446 by the weighted factor to produce a constant or substantially constant output signal.

The notch filters 464 and 466 may remove noise from the output signal at set or predetermined frequencies according to the transmission frequencies of the input signal. For example, the FFT 484 may determine the frequencies within the output signal at which noise is introduced, and the notch coefficient select 486 may calibrate the notch filters 464 and 466 to remove (or filter) the noise at the identified frequencies. For example, if the FFT 484 identifies that there is excessive noise at 50 GHz and 100 GHz, one notch filter may be set to remove the noise at 50 GHz and another notch filter may be set to remove the noise at 100 GHz. While FIG. 6 shows that there are two notch filters for each of the receivers 420, the present invention is not limited thereto. For example, in other embodiments, there may be any suitable number of notch filters, or the notch filters may be omitted all together.

The plurality of digital BPFs 468a, 468b, and 468c may include first to N digital BPFs to further filter the output signal at each of the N sub-band frequencies of the input signals to determine which one(s) of the input line(s) (e.g., X1 to Xm) has received a touch event. For example, the frequency control 488 may set each of the N sub-band frequencies of each of the input signals of each of the transmitters 410 (e.g., via the DACs 411, 413, and 414 and the VCOs 412, 414, and 416), and may control the digital BPF coefficient 490 to calibrate each of the digital BPFs 468a, 468b, and 468c to listen at the corresponding sub-band frequencies. Thus, each of the receivers may be synced with the N sub-bands of each of the transmitters 410 by adjusting the digital BPFs 468a, 468b, and 468c of each of the receivers to listen at the corresponding sub-band frequencies of each of the input signals. In this regard, the first digital BPF 468a may be tuned to the sub-band frequencies of the first input line (e.g., X1) to determine whether a touch event is received on the first input line, the second digital BPF 468b may be tuned to the sub-band frequencies of the second input line (e.g., X2) to determine whether a touch event is received on the second input line, and the Nth digital BPF 468c may be tuned to the sub-band frequencies of the Nth input line (e.g., Xm) to determine whether a touch event is received on the Nth input line.

The plurality of ABS blocks 470a, 470b, and 470c determines the absolute value of the corresponding output signal, and the plurality of integrators 460a, 460b, and 460c accumulate the absolute value for a set or predetermined time (e.g., one millisecond or a few hundred microseconds). The accumulated value is then compared with a threshold value by corresponding ones of the decision blocks 474a, 474b, and 474c to determine whether or not a touch event occurred on the touch screen panel TSP, and the location (e.g., row and column) at which the touch event occurred.

Accordingly, the transmitters 410 may input a plurality of input signals to the input lines (e.g., X1 to Xm) concurrently, and each of the receivers may monitor the output signal of the corresponding output line (e.g., Y1 to Yi) at the same sub-band frequencies of each of the input signals to determine whether or not a touch occurred on the touch screen panel TSP. Further, because each of the input lines receives an input signal having a unique sub-band of the useful frequency band, each of the receivers may determine the row in which the touch event occurred based on the unique sub-band frequencies of the row. Accordingly, a location (e.g., row and column) of the touch event may be determined.

While FIG. 5 shows that all of the input signals are input to the touch screen panel TSP sequentially, and FIG. 6 shows that all of the input signals are input to the touch screen panel TSP concurrently, the present invention is not limited thereto. For example, in some embodiments, the input lines (e.g., X1 to Xm in FIG. 3) may be divided into a plurality of horizontal blocks, and each of the horizontal blocks may include some of the input lines. In one embodiment, the input signals that are input to each of the input lines in each of the horizontal blocks may be input sequentially as described with reference to FIG. 5, and the input lines of a same order in each of the horizontal blocks receive the input signals concurrently. In one embodiment, the input signals that are input to each of the horizontal blocks may be input concurrently in each of the horizontal blocks as described with reference to FIG. 6, and the input signals may be input to the horizontal blocks sequentially. Accordingly, as would be appreciated by those skilled in the art, the transceiver systems of FIGS. 5 and 6 may be combined in various suitable forms according to design and/or timing limitations.

Figure 7:
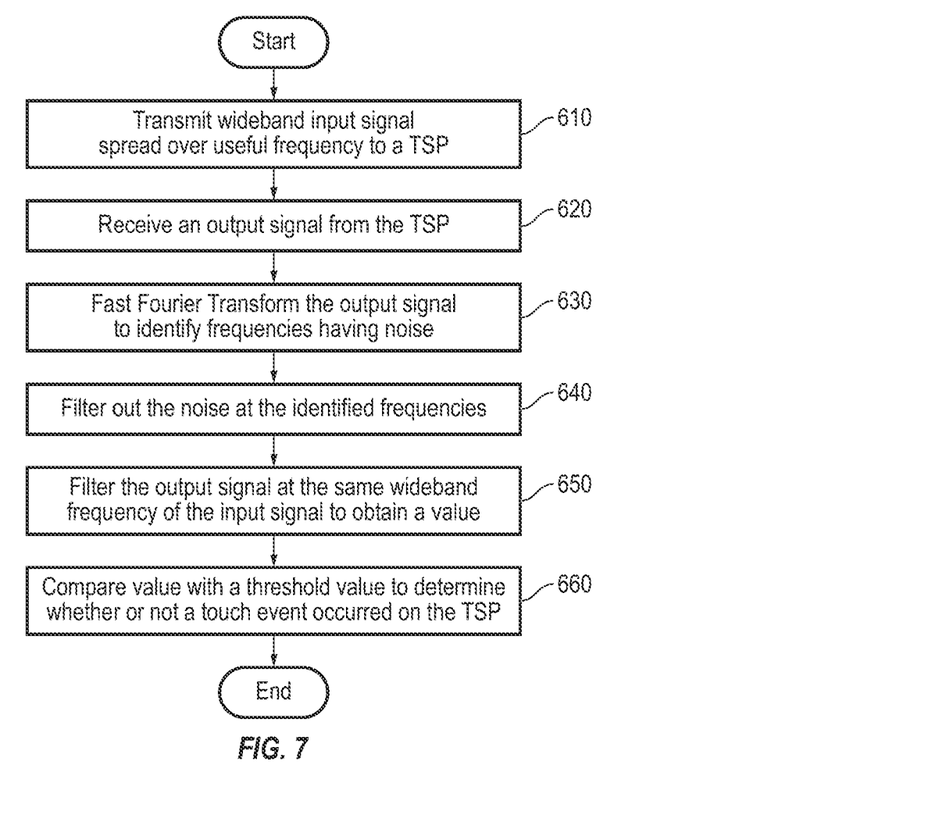
FIG. 7 is a flow diagram of a method of driving a touch screen panel according to one or more example embodiments of the present invention.

FIG. 7 is a flow diagram of a method of driving a touch screen panel according to an example embodiment of the present invention. However, the present invention is not limited to the sequence or number of the operations of the method shown in FIG. 7, and can be altered into any desired sequence or number of operations as recognized by a person of ordinary skill in the art. For example, in some embodiments, the order may vary, or the method may include fewer or additional operations.

Referring to FIG. 7, the method starts and at act 610, a wideband input signal that is spread over a useful frequency of a touch screen sensor (e.g., see FIGS. 4A-4D) of a touch screen panel TSP is transmitted to the touch screen panel TSP. At act 620, an output signal is received from the touch screen panel TSP.

At act 630, Fast Fourier Transform is performed on the output signal to identify frequencies in which noise is introduced. At act 640, the noise is filtered out at the identified frequencies.

At act 650, the output signal is filtered at the same wideband frequency of the input signal to identify a value. At act 660, the value is compared with a threshold value to determine whether or not a touch event occurred on the TSP.

According to one or more embodiments of the present invention, an input signal may be spread over a wideband of frequencies, and an output signal may be monitored according to the instantaneous frequency of the input signal to detect touch events on a touch screen panel.

According to one or more embodiments of the present invention, a transmitter may input the wideband input signal to input lines of the touch screen panel sequentially, and one or more receivers may monitor output signals of output lines of the touch screen panel at the same frequency of the input signal to determine whether or not a touch occurred on the touch screen panel and the location of the touch.

According to one or more embodiments of the present invention, the wideband input signal may be spread over sub-bands of a useful frequency band of a touch sensor of the touch screen panel, and the one or more receivers may each include a plurality of digital bandpass filters, each of the digital bandpass filters being tuned to monitor a corresponding sub-band frequency of each of the input signals to determine whether or not a touch occurred on the touch screen panel and to determine the location of the touch.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Although the present invention has been described with reference to the example embodiments, those skilled in the art will recognize that various changes and modifications to the described embodiments may be performed, all without departing from the spirit and scope of the present invention. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims, and their equivalents.

What is claimed is:

1. A transceiver system comprising:
a touch screen panel;
a transmitter configured to transmit an input signal to a plurality of input lines of the touch screen panel;
a receiver configured to receive an output signal from an output line of the touch screen panel to detect a touch event on the touch screen panel; and
a state machine circuit configured to set transmission frequencies of the input signal within a wideband operating frequency of the touch screen panel, and to calibrate the receiver to filter the output signal according to a current transmission frequency of the input signal, wherein the state machine circuit comprises multiple states and is configured to cycle through the multiple states within a period of time, and for each state, to set the current transmission frequency to a transmission frequency within the wideband operating frequency that is associated with a current state, wherein the period of time corresponds to an inverse of a refresh rate divided by a number of the plurality of input lines.

2. The system of claim 1, wherein the transmitter comprises:
a digital to analog converter; and
a voltage controlled oscillator.

3. The system of claim 1, wherein the state machine circuit comprises: a frequency control circuit configured to set the transmission frequencies of the input signal.

4. The system of claim 3, wherein the receiver comprises a digital bandpass filter, and
the state machine circuit further comprises a digital bandpass filter coefficient selector circuit to calibrate the digital bandpass filter according to the current transmission frequency.

5. The system of claim 1, wherein the receiver comprises:
a plurality of notch filters configured to remove noise at frequencies identified through Fast Fourier Transform of the output signal.

6. The system of claim 1, wherein the input signal is transmitted to the plurality of input lines sequentially.

7. The system of claim 1, wherein the input signal comprises a plurality of input signals that are divided into sub-bands of the wideband operating frequency, and
the input signals are transmitted to the plurality of input lines concurrently.

8. The system of claim 7, wherein the receiver comprises a plurality of digital bandpass filters, and
the state machine circuit comprises a digital bandpass filter coefficient selector circuit to calibrate each of the digital bandpass filters according to a corresponding one of the sub-bands.

9. A display device comprising:
a display panel configured to display an image at an active area;
a touch screen panel overlapping with the display panel at the active area;
a transmitter configured to transmit an input signal to a plurality of input lines of the touch screen panel;
a receiver configured to receive an output signal from an output line of the touch screen panel to detect a touch event on the touch screen panel; and
a state machine circuit configured to set transmission frequencies of the input signal within a wideband operating frequency of the touch screen panel, and to calibrate the receiver to filter the output signal according to a current transmission frequency of the input signal, wherein the state machine circuit comprises multiple states and is configured to cycle through the multiple states within a period of time, and for each state, to set the current transmission frequency to a transmission frequency within the wideband operating frequency that is associated with a current state, wherein the period of time corresponds to an inverse of a refresh rate divided by a number of the plurality of input lines.

10. The device of claim 9, wherein the transmitter comprises:
a digital to analog converter; and
a voltage controlled oscillator.

11. The device of claim 9, wherein the state machine circuit comprises:
a frequency control circuit configured to set the transmission frequencies of the input signal.

12. The device of claim 11, wherein the receiver comprises a digital bandpass filter, and the state machine circuit further comprises a digital bandpass filter coefficient selector circuit to calibrate the digital bandpass filter according to the current transmission frequency.

13. The device of claim 9, wherein the receiver comprises:
a plurality of notch filters configured to remove noise at frequencies identified through Fast Fourier Transform of the output signal.

14. The device of claim 9, wherein the input signal is transmitted to the plurality of input lines sequentially.

15. The device of claim 9, wherein the input signal comprises a plurality of input signals that are divided into sub-bands of the wideband operating frequency, and
the input signals are transmitted to the plurality of input lines concurrently.

16. The device of claim 15, wherein the receiver comprises a plurality of digital bandpass filters, and
the state machine circuit comprises a digital bandpass filter coefficient selector circuit to calibrate each of the digital bandpass filters according to a corresponding one of the sub-bands.

17. A method of driving a touch screen panel, the method comprising:
setting, by a state machine circuit, transmission frequencies of an input signal within a wideband operating frequency of the touch screen panel;
generating, by a transmitter, the input signal;
transmitting, by the transmitter, the input signal to a plurality of input lines of the touch screen panel; and
filtering, by a receiver, an output signal of the touch screen panel according to a current transmission frequency of the input signal,
wherein a state machine circuit configured to set transmission frequencies of the input signal within a wideband operating frequency of the touch screen panel, and to calibrate the receiver to filter the output signal according to the current transmission frequency of the input signal, wherein the state machine circuit comprises multiple states and is configured to cycle through the multiple states within a period of time, and for each state, to set the current transmission frequency to a transmission frequency within the wideband operating frequency that is associated with a current state, wherein the period of time corresponds to an inverse of a refresh rate divided by a number of the plurality of input lines.

18. The method of claim 17, further comprising:
applying, by the state machine circuit, Fast Fourier Transform on the output signal to identify frequencies having noise; and
filtering, by the receiver, the output signal at the identified frequencies.

19. The method of claim 17, wherein the input signal is sequentially transmitted to the plurality of input lines of the touch screen panel.

20. The method of claim 17, further comprising:
dividing, by the state machine circuit, the input signal into sub-bands of the wideband operating frequency; and
transmitting, by the transmitter, the sub-bands of the input signal to the plurality of input lines of the touch screen panel concurrently.

* * * * *